May 12, 1936. H. E. CRANE Re. 19,961

MOTOR COMPRESSOR UNIT

Original Filed March 17, 1927 2 Sheets-Sheet 1

INVENTOR
Harvey E. Crane
BY H. S. Dwaree
ATTORNEY

May 12, 1936. H. E. CRANE Re. 19,961

MOTOR COMPRESSOR UNIT

Original Filed March 17, 1927 2 Sheets-Sheet 2

INVENTOR
Harvey E. Crane
BY H. S. Kimmel
ATTORNEY

Reissued May 12, 1936

Re. 19,961

UNITED STATES PATENT OFFICE 19,961

MOTOR COMPRESSOR UNIT

Harvey E. Crane, Fort Wayne, Ind., assignor to The Hoover Company, a corporation of Ohio Original No. 1,704,655, dated March 5, 1929, Serial No. 175,975, March 17, 1927. Application for reissue February 18, 1931, Serial No. 516,704

16 Claims. (Cl. 230—58)

The object is to provide an improved gas compressing machine particularly adapted for use in connection with refrigerating systems; the invention disclosed relates particularly to the arrangement and construction of the compressor and the motor for driving the compressor.

A further object of the invention is to provide a fully enclosed motor compressor unit whereby the usual stuffing box about the compressor shaft to present leakage therearound may be dispensed with, or in other words, to provide an arrangement in which there are no moving parts exposed to the atmosphere which might need anything in the way of packing to prevent gas leakage.

A still further object of the invention is to provide a gas compressing unit wherein the motor and compressor are mounted upon a central main casting or frame through which all connections to and from said unit pass thereby permitting said unit to be made up and tested in full view before sealing.

A further object of the invention is to provide means in a motor compressor unit wherein all major parts are rigidly connected so that there will be no tendency for one part of the unit to become dislocated with respect to any of the others.

The objects of this invention are accomplished by employing a frame member which forms the support for both the motor and compressor of the unit and the other related parts of the motor compressor mechanism and to which frame are secured closures or domes by means of which the motor compressor unit is completely enclosed in an air-tight manner in order that gas under compression may not leak from the system nor air leak thereinto. The gas ports for the compressor and all electrical leads are preferably arranged within this frame so that there will be no danger of disruption thereof due to relative movement between the domes and said frame member.

Figure 1:
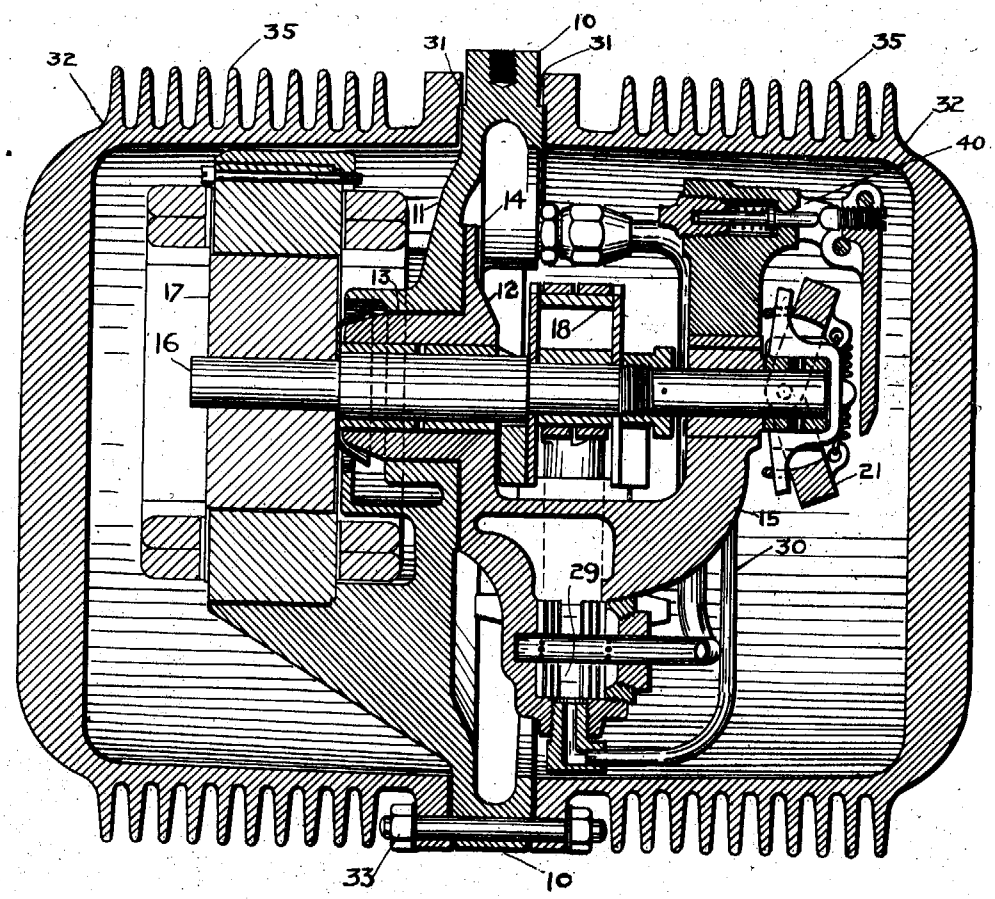
Figure 1 shows a complete motor compressor unit suitable for use in connection with refrigerating machines, the showing being in section substantially on lines 1—1 of Fig. 2.
Figure 2:
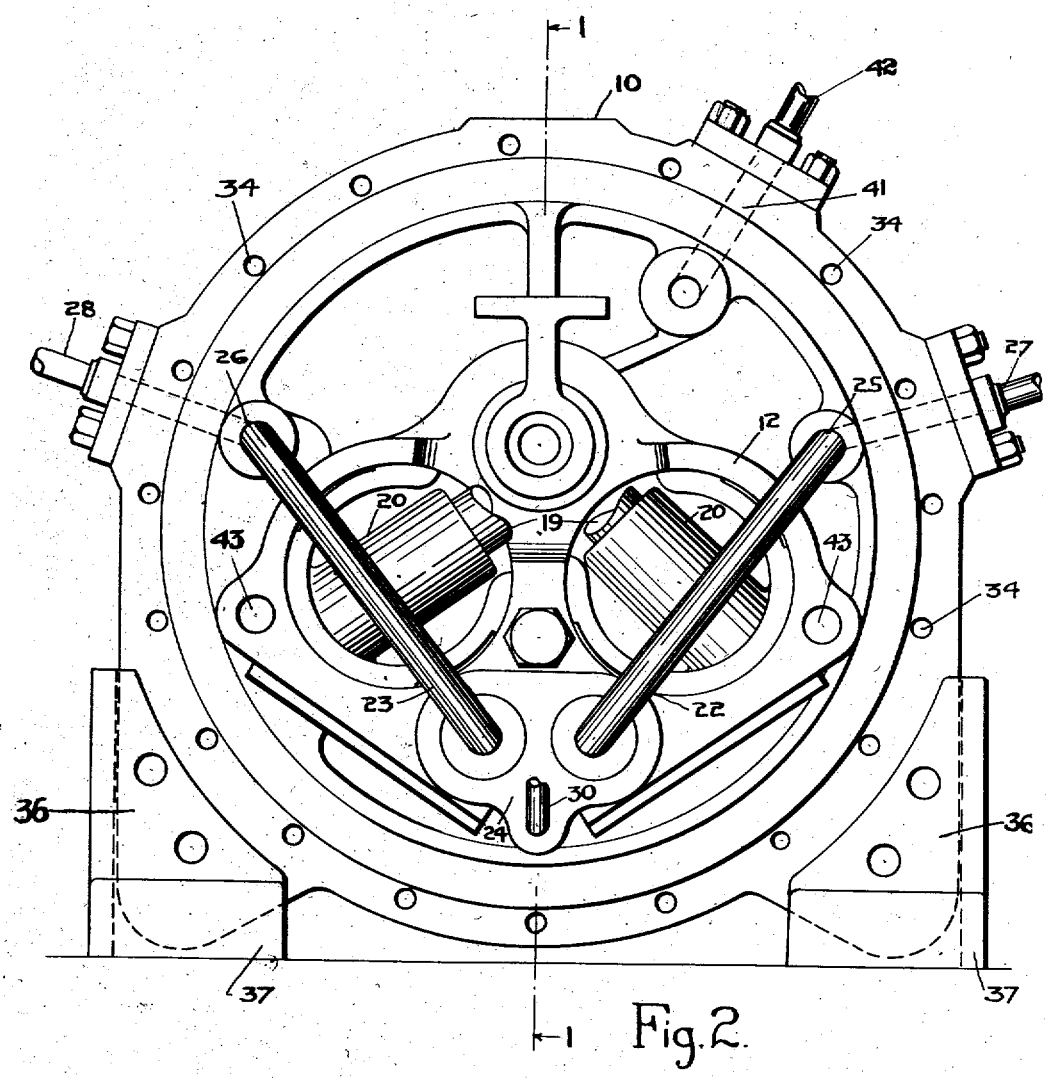
Fig. 2 is an end view of Fig. 1 with the outer dome moved and with certain parts left out for clearness of illustration, the view being taken from the compressor end of the unit.

In the drawings the main or frame casting is indicated by numeral 10 and comprises two major parts 11 and 12, the first, or the part indicated by numeral 11 being the portion of the casting forming the motor stator support while the portion 12 indicates the compressor support. These two parts of the main casting should be firmly secured together in any appropriate manner, and as shown, preferably by spot-welding through the flange 14. However these two parts may be made of a single piece, or they may be bolted together in the customary fashion.

Casting 12 is approximately U-shaped and the outer overhanging portion 15 thereof serves as an outer bearing support for the motor shaft.

It is to be understood that the main frame as above described may be made as a single piece if its design is not such as to make it difficult to cast as a single member, and that it is not necessary that the main frame 10 be limited to two major portions such as is specifically illustrated. The main frame may also comprise a major portion and several minor portions, the object of this invention being to provide a construction wherein the entire machine is supported from a main frame and not to provide a specific form of main frame support.

Mounted in casting 12 and therefore supported in casting 11 because of that connection existing between the castings, there is a motor shaft 16 which carries the motor-rotor 17 mounted on one end thereof, and also on the other side of the main bearing there is mounted on said shaft, an eccentric 18 for operating the pistons 19 of the compressor. Shaft 16 extends through and beyond the outer bearing formed in the outer portion 15 of the U-shaped frame member, and here is mounted a centrifugal compressor unloading device 21.

Cylinders 20 are mounted in bores of the frame casting 12 and as shown are of the oscillating type. It is not necessary that the compressor cylinders be of the particular type disclosed and the compressor may be of any desired type so long as it is supported on main frame assembly 10 and not on some part unconnected therewith so that there might be relative movement between the main frame and the compressor mounting.

As a part of frame member 12 there is provided a valve housing from which pipes lead as indicated at 22 and 23, these pipes being the high pressure pipes which lead from the valve casing 24 and connect to the main frame 11 at 25 and 26 discharging into passages therein which open therethrough at 27 and 28 for the discharge of high pressure gas, for instance, into the condenser of a refrigerating system.

A muffler for the compressed gas is incorporated in connection with the valve casing 24, and is indicated generally by numeral 29. The pipe 30 leads from the valve casing 24 to a pressure equalizing valve 40, so that when the machine stops the pressures throughout the system may equalize.

Suction gas is permitted to enter the unit through conduit 41 which may be connected, through pipe 42, to the expansion coils of a refrigerating system. The suction ports for the cylinders 20 are shown at 43, which of course take in such gas which enters the chamber formed by the domes 32.

The unit as thus far described will comprise a complete motor compressor unit which may be operated as such, the entire unit being mounted on a central frame with the motor projecting from one side thereof and the compressor from the other side thereof. Two domes 32 are provided for inclosing this apparatus, one to be placed over the motor side of the unit and the other over the compressor side of the unit. These domes may be secured to the main frame 11 through a series of bolts, one of which is shown at 33 as passing through the holes 34. However, the joints between these domes and the main frame 11 should form a gas tight seal.

Fins 35 are provided upon the enclosing domes 32 in order that the heat generated by the motor-compressor unit may be more readily dissipated.

Main frame casting 11 is provided at its bottom part with integral ears 36 to which may be secured angle members such as 37 whereby the entire unit may be mounted upon an appropriate base.

It will be seen that there has been provided a motor compressor unit which is very rugged in construction and one wherein there is the minimum liability for the parts to become disarranged. It is further apparent that during operation of this unit the domes 32 form a chamber for receiving the suction gas and that the motor and compressor units operate within this gas medium, for instance the suction gas enters the chamber formed by that dome 32 which incloses the compressor unit through conduit 41, and the compressor unit takes the gas therefrom through suction ports 43. That dome 32 which incloses the motor prevents the escape of any gas which may leak through the main bearing 13.

It is obvious that an arrangement of piping might be provided to connect the conduit 41 with the suction ports 43, then the domes 32 would serve merely to prevent the escape of any gas which might leak from the compressor; or as another modification the pipes 22 and 23 might be eliminated, under which condition the exhaust side of the compressor would open into the chambers formed by that dome 32 which incloses the compressor unit, and finally be carried off, for instance to the condenser of a refrigerating machine, through pipes 27 and 28; the compressor then operates in a gas medium of high pressure. However, in either modification there are no moving parts exposed to the atmosphere which might need packing to prevent leakage.

One of the great advantages of a construction such as has been described is that the main frame 10 may be set up complete without the domes 32 but with the motor and compressor attached, and the unit may be run in this condition to determine its fitness for the market; or in case the unit may need repairing it is merely necessary to remove either of the domes 32, as the case may require and suitable repairs and operating tests may readily be made.

By having the entire machine built up on the central casting 10 and placing the dome 32 over the motor and compressor, it is possible by sealing these domes to provide a construction wherein there is practically no liability of leakage, and further, it is possible to dispense with the usual shaft packing employed in machines of this general character.

I claim:

1. In a motor compressor unit, the combination of a main frame comprising the support for the unit, a motor and a compressor mounted on the main frame, driving connection between the motor and the compressor and closure members enclosing the motor and compressor and sealed to the main frame said motor and said compressor being supported entirely by said frame.

2. In a motor compressor unit, the combination of a main supporting frame, a motor mounted on one side of said frame, a compressor mounted on the other side of said frame, and a closure member mounted on each side of said frame and forming two separate chambers in which the motor and compressor are located respectively said motor and said compressor being supported entirely by said frame.

3. A motor compressor unit comprising in combination a central main frame, closure members secured to each side of said frame and forming two distinct chambers, a motor located in one of said chambers and a compressor in the other, said motor and said compressor being supported entirely by said frame.

4. In a gas compressing machine the combination of a main frame member comprising a support for both a prime mover and a compressor and closure members in sealed relation with said frame member, said frame extending beyond said closure members forming a base said motor and said compressor being supported entirely by said frame.

5. In a gas compressing machine, the combination of a main frame member, a motor mounted on one side of said frame member and a compressor on the other, closure members in sealed relation with said frame member forming individual chambers housing said motor and said compressor and conduits passing through said frame member and connecting said chamber housing the compressor with the exterior, said motor and said compressor being supported entirely by said frame member.

6. In a motor compressor unit the combination of a main supporting frame, a motor carried by said frame, a compressor carried by said frame and operably connected to said motor, gas conduits formed in said frame to convey gas to and from said compressor and enclosing members sealing said motor and said compressor in individual chambers on opposite sides of said frame, said motor and said compressor being supported entirely by said frame.

7. In a motor compressor unit the combination of a main supporting frame, a motor and a compressor mounted on the main frame, driving connection between the motor and the compressor and closure members sealed to the main frame and supported thereby, said motor and said compressor being supported entirely by said frame.

8. A motor compressor unit comprising in combination a central main frame, closure members secured to each side of said frame, and forming two distinct chambers therewith, a motor located in one of said chambers and a compressor in the other, and a driving connection between the motor and compressor, said motor and said compressor being supported entirely by said frame.

9. In a motor compressor unit the combination of a main frame, a motor carried by said frame, a compressor carried by said frame and operably connected to said motor, a gas conduit formed in said frame connected to said compressor and closing members connected to said main frame for sealing the motor and the compressor from the atmosphere said motor and said compressor being supported entirely by said frame.

10. In a motor compressor unit the combination of a main frame comprising a support for the unit, a motor and a compressor mounted on said main frame, a driving connection between the motor and the compressor and closure members sealed to the main frame, said motor and said compressor being supported by said main frame entirely independently of said closure members.

11. In a motor compressor unit the combination of a main supporting frame, a motor mounted on one side of said frame, a compressor mounted on the other side of said frame, and closure members mounted on each side of said frame and forming with the frame two separate closed chambers in which the motor and compressor are located respectively, said motor and said compressor being supported on said main frame independently of said closure members and said frame being supported independently of said closure members.

12. In a gas compressing machine the combination of a main frame member comprising the sole support for both a prime mover and a compressor, and closure members in sealed relation with said main frame for sealing the prime mover and compressor from the atmosphere and said frame extending beyond said closure members and forming a base.

13. In a gas compressing machine the combination of a main frame member, a motor and a compressor mounted on said frame member, said motor and said compressor being supported entirely by said frame member, closure members in sealed relation with said frame member for sealing the motor and compressor from the atmosphere and conduits passing through said frame member and connected to said compressor.

14. In a motor compressor unit the combination of a main supporting frame, a motor carried by said frame, a compressor carried by said frame and operably connected to said motor, a gas conduit formed in said frame and connected to said compressor and closure members in sealed relation with said frame for sealing said motor and said compressor from the atmosphere, said motor and said compressor being supported independently of said closure members.

15. A motor operated pump comprising a casing having a central supporting portion and means forming a compartment on each side thereof, a unit pump located in one of said compartments, a motor located in another compartment and driving means connecting said motor and pump, said pump and said motor being supported entirely by said central supporting portion.

16. In a motor compressor unit, a main frame comprising a supporting section and an extension at one side thereof, a motor mounted on said extension and having an armature shaft journalled in and extending through the supporting section, a compressor actuated by said motor shaft mounted on said main frame at the side opposite said motor, a closure member cooperating with said main frame to provide a fluid-tight compartment housing said motor, and a second closure member secured to said main frame to form a second fluid-tight compartment enclosing said compressor, said motor and said compressor being supported entirely by said frame.

HARVEY E. CRANE.